(12) United States Patent
Deckers

(10) Patent No.: US 6,650,961 B2
(45) Date of Patent: Nov. 18, 2003

(54) DISK CARTRIDGE DATA STORAGE APPARATUS

(75) Inventor: Stephen V. Deckers, Eagle, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 108 days.

(21) Appl. No.: 09/924,201

(22) Filed: Aug. 7, 2001

(65) Prior Publication Data

US 2003/0040836 A1 Feb. 27, 2003

(51) Int. Cl.$^7$ .................................................. G06F 7/00
(52) U.S. Cl. .......................... 700/213; 360/79; 360/86; 360/97.01
(58) Field of Search ................................ 700/213, 218; 360/79, 86, 97.01

(56) References Cited

U.S. PATENT DOCUMENTS

| | | |
|---|---|---|
| 4,527,262 A | 7/1985 | Manto |
| 4,717,981 A | 1/1988 | Nigam et al. |
| 5,140,478 A | 8/1992 | Yoshida |
| 5,214,550 A | 5/1993 | Chan |
| 5,610,902 A * | 3/1997 | Childers et al. ............. 369/289 |
| 5,761,161 A * | 6/1998 | Gallo et al. ............... 369/30.48 |
| 5,818,723 A * | 10/1998 | Dimitri ....................... 700/214 |
| 5,835,465 A * | 11/1998 | Yachida .................... 369/53.16 |
| 5,870,245 A * | 2/1999 | Kersey et al. ................. 360/92 |
| 6,195,007 B1 | 2/2001 | Takayama et al. |
| 6,243,332 B1 * | 6/2001 | Dimitri et al. ............ 369/30.31 |
| 6,304,524 B1 * | 10/2001 | Gallo et al. ............... 369/30.28 |
| 6,392,878 B1 * | 5/2002 | Noh ............................ 361/685 |
| 6,473,297 B1 * | 10/2002 | Behl et al. .................... 361/685 |
| 6,490,242 B1 * | 12/2002 | Bonn et al. .................. 369/291 |
| 6,510,125 B1 * | 1/2003 | Shigetomi et al. .......... 369/273 |

FOREIGN PATENT DOCUMENTS

| | | |
|---|---|---|
| GB | 2303960 | 3/1997 |
| JP | 020121015 | 5/1990 |
| JP | 080212016 | 8/1996 |
| JP | 110185355 | 7/1999 |
| JP | 2000285566 | 10/2000 |

OTHER PUBLICATIONS

European Patent Application; Document No.: EP0692782 A2; Publication Date: Jan. 17, 1996; Name of Applicant: Nomai; Pertinent Disclosure Located at: Abstract, Figs. 1–3.

* cited by examiner

Primary Examiner—Khoi H. Tran

(57) ABSTRACT

Methods and apparatus for storing data which employ a hard disk memory media which is operably supported within a cartridge shell to form a disk cartridge. The disk cartridge can be employed in the manner of a tape cartridge wherein the disk cartridge can be stored in a communicatively isolated condition until required for read/write operations whereupon the disk cartridge can be communicatively linked to another device which transmits data to, or receives data from, the disk cartridge. The disk cartridge can adhere to a given tape cartridge form factor so as to enable both tape cartridges and disk cartridges to be employed together in a single automated library system.

1 Claim, 3 Drawing Sheets

DISK CARTRIDGE DATA STORAGE APPARATUS

FIELD OF THE INVENTION

This invention pertains to methods and apparatus for storing data. More specifically, the invention pertains to methods and apparatus for storing data which methods and apparatus employ hard disk data storage media which are enclosed within a cartridge shell.

BACKGROUND OF THE INVENTION

Many various types of prior art data storage apparatus and methods are known. Of the known data storage systems, two of the more widely used types are those which comprise tape drives and those which employ hard disk drives. As the respective names imply, tape drives and hard disk drives each employ specific types of media on which to store data. That is, tape drives employ reels of magnetic tape strips as data storage media, while hard disk drives employ one or more stacked hard disk "platters" as data storage media.

Typically, the magnetic tape type of media is supported on one or more reels which are enclosed in a cartridge shell, or casing. The tape, together with the cartridge shell, is referred to as a "tape cartridge." Such tape cartridges are configured to be selectively placed into a slot, or opening, of a tape drive, wherein the tape is extracted from the cartridge so that data can be read from, and/or written to, the tape. When the reading, and/or writing, of the tape is completed, the tape is wound back into the cartridge, and the tape cartridge is removed from the slot of the tape drive and placed on a storage rack or the like. The cartridge configuration of the tape facilitates ease of handling a great number of tapes, wherein each tape cartridge can be quickly exchanged between a storage position and a tape drive for read/write operations.

Tape cartridges typically adhere to one of a plurality of accepted cartridge form factors. By "cartridge form factor" I mean a given set of standardized physical configurational and dimensional criteria which apply to the design of cartridges. Various specific data storage cartridge form factors have been developed, and include cartridge form factors known by the designations of: DAT (Digital Audio Tape); DDS (Digital Data Storage); DLT (Digital Linear Tape); and LTO (Linear Tape Open) The adherence of tape cartridges to a given known standard cartridge form factor allows for wide spread interchangeability of tape cartridges which adhere to a common form factor.

Often, a plurality of tape cartridges are employed in conjunction with an automated library system or the like. Automated library systems typically comprise storage racks or supports, at least one robotic cartridge handling device, and at least one tape drive. The storage racks are configured to support the plurality of tape cartridges. The robotic cartridge handling device is configured to selectively move given tape cartridges from the storage rack to the tape drive, and to insert the tape cartridge into the slot of the tape drive. While the tape cartridge is in the slot of the tape drive, read/write operations can be performed on the tape. The robotic cartridge handling device is also configured to remove the respective tape cartridges from the tape drive after the read/write operations have been performed on the tape cartridge, and to replace the tape cartridges onto the storage rack.

Thus, a typical automated library system is configured to move tape cartridges between respective stored positions on a storage rack and a tape drive, as required. Generally, a controller or the like is used to control the operation of the automated library system. For example, a controller, when connected in signal communication with the robotic handling device, can be configured to direct the robotic handling device to move a specific, given tape cartridge from its stored position on the storage rack to a tape drive in response to a requirement to retrieve given data which is stored on the given tape cartridge. As is evident, tape cartridges, when used in conjunction with an automatic library system, for example, are relatively well-suited for long-term storage and archiving of large amounts of data. However, one disadvantage of magnetic tape is that data reading/writing operations are relatively slow compared to magnetic hard disks, for example. Moreover, accessing random portions of data from magnetic tape can be significantly slow compared to magnetic hard disks.

Hard disks are generally known to provide exceptionally rapid data storage and retrieval, as well as high levels of storage capacity. Hard disks are typically employed in "disk arrays." A typical disk array comprises a frame or rack that is configured to support a plurality of modules or the like which each contain one or more hard disks along with a disk drive. The modules which contain the hard disks and disk drive are generally configured to be semi-permanently supported on the frame or rack. That is, the modules are generally configured to remain supported in place on the frame or rack and communicatively linked with at least one other device, except for repair and/or replacement of a malfunctioning module in which case the malfunctioning module is communicatively disconnected from the other respective devices and removed from the array. In other words, prior art data storage methods and apparatus which employ a plurality of hard disks are typically limited in regard to the functional use of each hard disk to situations in which all of the hard disks are communicatively linked together so as to be immediately available, on demand, for read/write operations. As a result, the prior art use hard disks for data storage necessitates relatively large and cumbersome disk arrays which comprise a great number of modules.

What are needed then, are data storage methods and apparatus which achieve the benefits to be derived from similar prior art devices, but which avoid the shortcomings and detriments individually associated therewith.

SUMMARY OF THE INVENTION

The invention includes methods and apparatus for the storage of data wherein a disk cartridge is employed. The disk cartridge is a primary focus of the instant invention, wherein the disk cartridge comprises a hard disk storage medium which is operably supported within a cartridge shell. The disk cartridge can be quickly retrieved from a communicatively isolated storage condition and temporarily communicatively linked to a device such as a host computer, whereupon data can be transmitted between the host and the disk cartridge, such as in read/write operations. The term "communicatively isolated" as used herein means that the disk cartridge is not linked by any communication means to any other device. When the disk cartridge is not required for read/write operations, the disk cartridge can be communicatively unlinked, or disconnected, from the host computer, for example, and restored to its communicatively isolated condition, wherein the disk cartridge is not communicatively linked to any device.

In accordance with one embodiment of the present invention, an apparatus for storing data includes a disk cartridge and a docking device which is configured to temporarily accept the disk cartridge in communicative linkage therewith. That is, the docking device is configured to temporarily support the disk cartridge during which time the docking device and the disk cartridge are in signal communication with one another so that data can be transmitted there between. The disk cartridge comprises a cartridge shell and a hard disk memory medium operably supported within the cartridge shell. The disk cartridge can be moved to the docking device either manually or by way of an automated cartridge handling system or the like. The cartridge shell can adhere to a known cartridge form factor so that existing cartridge handling systems can be employed.

In accordance with another embodiment of the present invention, a data storage apparatus includes a disk cartridge which has a cartridge shell, a hard disk supported within the cartridge shell, and a cartridge interface mounted on the cartridge shell. The apparatus also includes a docking device which defines a receptacle configured to receive the cartridge shell. The docking device further includes a docking device interface which is mounted on the docking device and which is configured to interact with the cartridge interface, thereby communicatively linking the disk cartridge and the docking device. The docking device interface can be, for example, a connector (such as a pin connector), or a wireless connection, such as by infrared data transmission or the like. The apparatus can further include a tape cartridge and a tape drive which is configured to accept the tape cartridge for performance of read/write operations thereto. The tape drive can be integrated into the docking device. Furthermore, the tape cartridge and disk cartridge can adhere to a common cartridge form factor. This can allow for both the tape cartridge and the disk cartridge to be employed in conjunction with a single docking device which is configured to communicatively link with both the tape and disk cartridges.

In accordance with another embodiment of the present invention, a data storage method includes providing a hard disk memory medium, and providing a host device. The method also includes storing the hard disk memory medium in a communicatively isolated condition and communicatively linking the hard disk storage medium to the host device. This can allow for data to be written to the hard disk memory medium from the host device. After data is written to the hard disk memory medium from the host device, the hard disk is restored to a communicatively isolated condition. After a period of time has elapsed, the hard disk memory medium can be communicatively re-linked to the host device. That is, the hard disk can be linked again in signal communication with the host device. Data can thus be read from the hard disk memory medium to the host device. That is, data can be read from the hard disk and transmitted to the host device. The hard disk memory medium can be at least a portion of a disk cartridge, wherein the hard disk is operably supported within a cartridge shell. The communicative linkage of the hard disk with the host device can be accomplished by way of docking device into which the disk cartridge can be placed. The disk cartridge can be placed into the docking device by an automatic cartridge handling device.

DETAILED DESCRIPTION OF THE INVENTION

Figure 2:
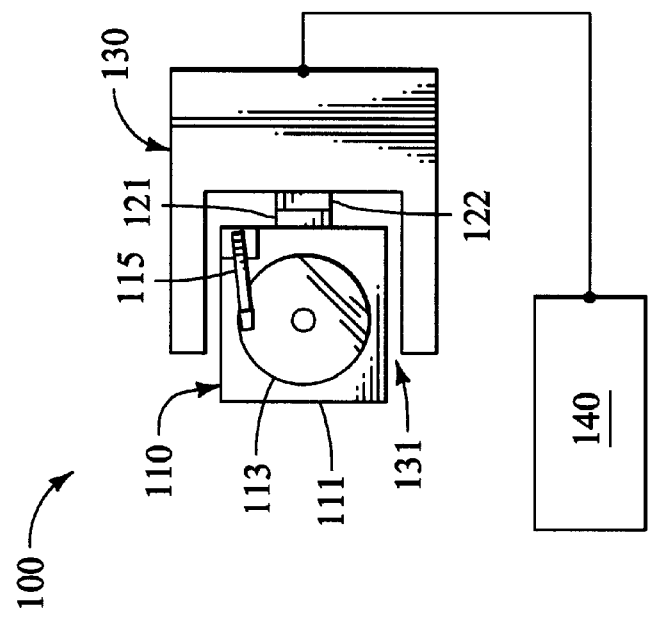
FIG. 2 is another schematic diagram of the apparatus which is depicted in FIG. 1

The present invention includes methods and apparatus for storing data which employ the use of a hard disk which is supported within a cartridge shell so as to form a disk cartridge. The disk cartridge can be selected and retrieved from a communicatively isolated storage condition so as to be communicatively linked with another device such as a host computer or the like. The term "communicatively isolated," as used herein, means a condition in which the communicatively isolated device is not linked for any type of communication by any means to any other device. The term "communicatively linked," as used herein, means essentially the opposite of the term "communicatively isolated." That is, a first device and a second device which are "communicatively linked" to one another are thus linked by any of a number of possible communication means by which data can be transmitted between the first and second devices.

When the disk cartridge is communicatively linked with a device such as a host computer, read/write operations can be performed on the disk cartridge. For example, while communicatively linked to a host computer, data can be read from the hard disk and transmitted to the host computer. Similarly, data can be transmitted from the host computer to the disk cartridge to be written to the hard disk while the disk cartridge is communicatively linked to the host. When not needed for read/write operations, the disk cartridge can be returned to its isolatively stored condition, wherein the disk cartridge is not communicatively linked to any other device, and wherein the data stored on the disk cartridge awaits future retrieval.

The present invention is particularly suited for use for archival and back-up data storage situations in which large amounts of data are to be efficiently stored for long periods of time, and which are to be quickly retrieved and updated. It is understood that the disk cartridges of the instant invention can be used in conjunction with many features or accessories which are commonly employed for use with prior art tape cartridges although such features and accessories are not specifically described herein. For example, the disk cartridges of the instant invention can be used in conjunction with bar code readers and the like, as well as cartridge memory devices, which are commonly employed in conjunction with prior art tape cartridges. Such bar code readers and cartridge memory devices can be used for identifying specific cartridges and the like, for example.

As mentioned above, the present invention makes use of a hard disk memory medium contained in a cartridge shell. The hard disk and the cartridge shell together make up a disk cartridge. The disk cartridge of the instant invention is to be distinguished from prior art hard disks and associated housings which are not "disk cartridges." A "disk cartridge," as the term will be used herein, means a hard disk memory medium enclosed within a cartridge shell in a configuration which allows the disk cartridge unit to be easily communicatively linked to, and communicatively unlinked from, a host device such as a computer simply by placing the disk cartridge into a docking device which acts as an intermediate interface between the disk cartridge and the host device. That is, the disk cartridge of the instant invention can be communicatively linked to another device singly as a function of the placement and position of the disk cartridge.

More specifically, for example, the mere act of placing the disk cartridge into the docking device in accordance with the instant invention results in the communicative linkup of the hard disk (which is contained within the cartridge shell of the disk cartridge) with the host device. Thus, the disk cartridge can be inserted into, and removed from, the docking device quickly and easily without the use of tools such as screwdrivers and the like, and without additional operations intended to communicatively link, or supportively secure, the disk cartridge to any other device such as the docking device.

Additionally, the disk cartridge is configured to be exposed directly to the ambient environment, whereas prior art hard disk housings are designed with the intent that they will be enclosed within another outer housing, such as a computer or a disk array. Further, a cartridge shell is generally configured to be received in, and supported within, a receptacle formed in the outer surface of the docking device, whereas prior art hard disk housings are typically configured to be supported by a tray or chassis within a computer or a disk array. Moreover, the disk cartridges of the instant invention are specifically intended to be compatible with automated cartridge handling systems, and are preferably used with existing automated cartridge handling systems which have been developed for use in conjunction with prior art tape cartridges. Thus, the disk cartridge and the docking device of the instant invention can be integrated into existing prior art automated tape libraries and the like in order to expand the capacity and efficiency of such systems.

Figure 1:
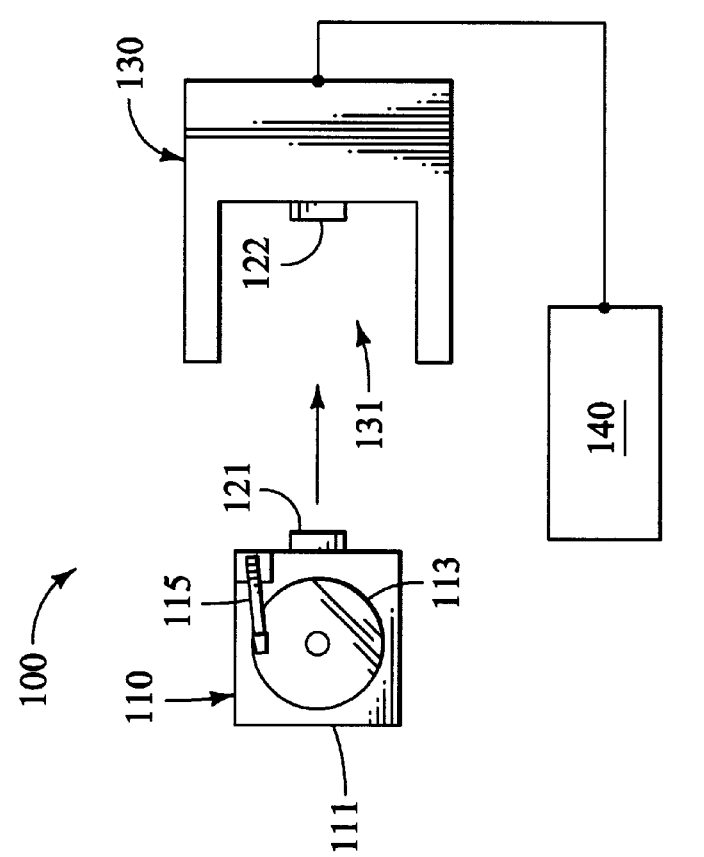
FIG. 1 is a schematic diagram of an apparatus in accordance with one embodiment of the present invention.

Turning now to FIG. 1, a schematic diagram is shown which depicts an apparatus 100 in accordance with one embodiment of the present invention. The apparatus 100 comprises a disk cartridge 110. The disk cartridge 110 comprises a hard disk 113 which is operably supported within a cartridge shell 111. When I say "hard disk" I mean a substantially rigid disk which is utilized as a memory medium for storing data thereon. Hard disks are known in the art. One type of hard disk is a magnetic disk that generally comprises magnetic recording material which is layered onto a high-precision aluminum or glass disk. However, it is understood that the term "hard disk," as used herein is intended to include any type of substantially rigid disk which is utilized as a memory medium for storing data thereon. For example, a hard disk can also include an optical memory disk, such as a Compact Disk (CD), or the like. Thus, the hard disk 113 can be a magnetic disk, an optical disk, as well as any other type of hard disk.

The cartridge shell 111, or casing, in which the hard disk 113 is housed is preferably fabricated from a durable material such as injection-molded plastic or the like. Also, the cartridge shell 111 preferably adheres to a known cartridge form factor such as, for example, a tape cartridge form factor. That is, the cartridge shell 111 can adhere to any one of a number of known form factors, such as those known by the designations of DAT, DDS, DLT, or LTO. In other words, the cartridge shell 111 can preferably have exterior dimensions that are substantially identical to the exterior dimensions of a given type of tape cartridge. It is understood, however, that the cartridge shell 111 need not adhere to a known cartridge form factor, and need not adhere to a tape cartridge form factor. It is understood that the cartridge shell 111 of the disk cartridge 110 can be configured so as to provide physical features which enhance handling thereof by an automatic cartridge handling device or the like as will be more fully described below.

As previously mentioned, the disk cartridge 110 comprises the hard disk 113, and the cartridge shell 111 in which the disk cartridge is supported. When I say "disk cartridge" I mean a memory unit containing a hard disk memory medium therein, which is configured to be temporarily retrieved from an communicatively isolated condition. The communicatively isolated condition can be attained, for example, during the time the disk cartridge is stored on a storage device or the like. During the temporary retrieval from the communicatively isolated condition, the disk cartridge is (typically) to be communicatively linked, either directly or indirectly, to a host computer or other such device allowing data transfer between the host and the disk cartridge.

Thus, by the expression "communicatively linked", I mean that the disk cartridge is in signal communication with the host such that during the communicative linking, data is either read from the hard disk and transmitted to the host, or transmitted from the host and written to the hard disk. Furthermore, the memory unit, which is denoted by the term "disk cartridge" as used herein, is configured to retain data therein while being stored in an isolated condition. In otherwords, the disk cartridge 110 is configured to retain data which is written on the corresponding memory medium during the isolated storage status of the disk cartridge.

When I say "stored in an isolated condition," "isolatively stored," or "communicatively isolated," I mean a status or condition of a given disk cartridge, wherein the given disk cartridge is not communicatively linked to any other object, such as a host computer. That is, the given disk cartridge is not linked by any type of communication means to any other device. Such a status or condition necessarily precludes any type of communication between the disk cartridge and any other device. Thus, the two status of "communicatively linked" and "communicatively isolated (etc.)" are mutually exclusive terms with respect to one another.

In addition to housing the hard disk 113, the cartridge shell 111 preferably also operably houses, or supports, any other components which are required to enable the hard disk to function as a memory medium. For example, the cartridge shell 111 can house a read/write device 115 which is configured to read data from the hard disk 113, and which is also configured to write data to the hard disk. The read/write device 115 can comprise a read/write head (not shown) as well as an actuator (not shown) for moving the read/write head, and a motor (not shown) for rotating the hard disk 113.

However, it is understood that such additional components other than the hard disk 113 itself are not necessarily housed or supported within the cartridge shell 111, as will be discussed in greater detail below. That is, any components which are required to enable the hard disk 113 to function as a memory medium can be located either onboard the disk cartridge 110, or in a remote location so as to be accessed, for example, during temporary communicative linking of the disk cartridge with a host computer.

The apparatus 100 additionally preferably comprises a cartridge interface 121 which is preferably supported on the cartridge shell 111 as shown, and more preferably is rigidly supported on the cartridge shell. The cartridge interface 121 can act as a gateway, or port, through which data is passed, both into and out of the disk cartridge 110. That is, the cartridge interface 121 is a point from which data signals are transmitted from the disk cartridge 110, as well as a point to which data signals are received into the disk cartridge.

When I say that the cartridge interface 121 is "supported on the cartridge shell" I mean to include any position of the cartridge interface with respect to the cartridge shell 111. For example, the cartridge interface 121 can be supported on the cartridge shell 111, wherein the cartridge interface is substantially external with respect to the cartridge shell. Alternatively, for example, the cartridge interface 121 can be supported on the cartridge shell 111, wherein the cartridge interface is substantially internal with respect to the cartridge shell. In other words, the cartridge interface 121 can be supported on the cartridge shell 111 in substantially any position with respect thereto which will enable the cartridge interface to function as intended.

The cartridge interface 121 can be at least a portion of a connector. Specifically, for example, the cartridge interface 121 can be at least a portion of any one of a number of known types of connectors which are employed in data signal connections, such as those commonly known by the designations of SCSI, IDE, Fibre Channel, and the like. The cartridge interface 121, as will be discussed further below, need not be limited in form to a connector or a portion thereof. That is, as will be explained, the cartridge interface 121 can be configured in forms other than that of a connector, or portion thereof.

As is further evident from a study of FIG. 1, the apparatus 100 can further comprise a docking device 130. When I say "docking device" I mean any device which is configured to temporarily receive any given disk cartridge (such as disk cartridge 110) so as to be temporarily communicatively linked thereto. In other words, in "temporarily receiving" a given disk cartridge 110, the docking device 130 communicatively links with the given disk cartridge so as to facilitate signal communication there between for the passage of data. Preferably, the docking device 130 is configured such that, when the given disk cartridge 110 is received by the docking device, signal communication is automatically established there between.

For example, the docking device 130 can be configured to temporarily receive any given disk cartridge 110 so as to support the given disk cartridge, wherein placement of the disk cartridge in such supported position automatically results in a communicative link up between the disk cartridge and the docking device. Specifically, in furtherance of the purpose of the docking device 130, the apparatus 100 preferably comprises a receptacle 131. The receptacle 131 is preferably defined on the docking device 130. The receptacle 131 is configured to receive and temporarily support the disk cartridge 110 therein. Furthermore, the mere placement of the disk cartridge 110 within the receptacle preferably automatically results in the establishment of signal communication between the docking device and the supported disk cartridge wherein the docking device and disk cartridge are communicatively linked.

As is evident from a study of FIG. 1, the apparatus 100 can comprise a host device 140. The host device 140 can be, for example, a host computer or the like. The host device 140 can be in signal communication with the docking device 130, as shown. Thus, when the disk cartridge 110 is communicatively linked with the docking device 130, the host device 140 can also be in signal communication with the disk cartridge. In this manner, data can be transmitted between the disk cartridge 110 and the host device 140 by way of the docking device 130. For example, data can be transmitted from the host device 140 to be written to the hard disk 113 of the disk cartridge 110 by way of the docking device 130. Likewise, data can be read from the hard disk 113 of the disk cartridge 110 and can thus be transmitted to the host device 140 by way of the docking device 130. As is evident, the docking device 130 can act as an intermediate device through which data can be passed between the disk cartridge 110 and other devices, such as the host device 140.

As is further seen, the docking device 130 preferably comprises a docking interface 122. The docking interface 122 is preferably mounted on the docking device 130 and within the receptacle 131 so as to facilitate, along with the cartridge interface 121, the temporary communicative linkage of the disk cartridge 110 with another device, such as the host computer 140. That is, the docking interface 122 is configured to communicatively link with the cartridge interface 121 in order to facilitate the passage of data between the disk cartridge 110 and any other device, such as the host computer 140. As explained above with regard to the cartridge interface 121, the docking interface can be supported on the docking device 130 in substantially any position with respect thereto which will enable the docking interface to function as intended.

As is also the case with the cartridge interface 121, the docking interface 122 can be at least a portion of a connector, such as a pin connector or the like, which is configured to matingly connect with the cartridge interface 121 in the case wherein the cartridge interface is also at least a portion of a connector. More specifically, for example, the cartridge interface 121 can be a first portion of an SCSI connector while the docking interface 122 can be a second portion of an SCSI connector, wherein the first and second portions are configured to matingly connect with one another so as to establish a communicative link-up for the passage of data signals there between.

However, as explained above with regard to the cartridge interface 121, the docking interface 122 also need not be limited in form to that of a connector, or portion thereof. That is, while the docking interface 122 can be at least a portion of any one of a number of known types of connectors such as those known by the designations of SCSI, IDE, Fibre Channel, and the like, the docking interface can be configured in forms other than that of a connector, or portion thereof, as will be explained more fully below.

As is evident, the apparatus 100 is generally configured so that the disk cartridge 110 can be placed, either manually or by way of an automatic cartridge handling device (not shown) or the like, into the receptacle 131 in order to facilitate a temporary communicative link-up between the disk cartridge and any other device such as the host computer 140. Such a communicative link-up can be facilitated by the substantial alignment of the cartridge interface 121 with the docking interface 122. Preferably, such alignment of the cartridge interface 121 with the docking interface 122 can be facilitated by the action of the cartridge shell 111 against the receptacle 131 as the disk cartridge 110 is placed into the receptacle, wherein the receptacle is shaped so as to cause substantial alignment of the disk cartridge when placed therein.

Moving now to FIG. 2, a schematic diagram is shown which depicts the apparatus 100, wherein the disk cartridge 110 is shown in place within the receptacle 131. It is noted that, when the disk cartridge 110 is in place within the receptacle 131 as shown, the cartridge interface 121 and the docking interface 122 can be caused to be substantially aligned with one another so as to facilitate the temporary communicative link-up of the disk cartridge with the docking device 130. As mentioned above, the communicative link-up of the disk cartridge 110 and the docking device 130, enables the disk cartridge 110 to be in signal communication with any other device (such as the host computer 140) which is communicatively linked with the docking device. Thus, data signals can be passed, for example, between the host computer 140 and the disk cartridge 110 by way of the cartridge interface 121 and the docking interface 122 when the disk cartridge is placed into the receptacle 131 so as to cause a communicative link-up of the disk cartridge and the docking device.

As noted above, the cartridge interface 121 and the docking interface 122 need not be connector portions which are configured to contact one another as shown in FIG. 2. That is, the cartridge interface 121 and the docking interface 122 can be configured to facilitate a temporary communicative link-up between the disk cartridge 110 and the docking device 130 without contact between the cartridge interface 121 and the docking interface 122. For example, the cartridge interface 121 and the docking interface 122 can form at least a portion of a wireless transmission device. That is, the cartridge interface 121 and the docking interface 122 can be configured to transmit data signals there between by wireless means. For example, the cartridge interface 121 and the docking interface 122 can be configured to communicate with one another by light beam transmission (such as infra-red (I/R), or laser), or by short-range radio wave transmission (such as Bluetooth®), wherein contact there between is not required between the cartridge interface and the docking interface. Bluetooth® is a short range wireless communication protocol. (Bluetooth is a trademark of Telefonaktiebolaget LM Ericsson CORPORATION SWEDEN.)

Furthermore, in such cases wherein the cartridge interface 121 and docking interface 122 are configured to communicate data signals there between by certain types of wireless communication means such as Bluetooth® for example, alignment of the respective interfaces during placement of the disk cartridge into the receptacle will not necessarily be required for such communication of data signals. That is, direct exposure, or alignment, of the cartridge interface 121 and the docking interface 122 with one another is not required for embodiments of the instant invention in which wireless signal communication means are utilized, wherein such wireless means do not require such direct exposure or alignment of the respective interfaces.

Although the primary function of the cartridge interface 121, along with the docking interface 122, is to facilitate signal communication between the disk cartridge and other devices (such as the host computer 140), it is understood that power can also be transmitted to the disk cartridge by way of the cartridge interface and the docking interface. That is, if the disk cartridge 110 requires an external power supply for operation, the required power can be supplied to the disk cartridge by way of a power link between the cartridge interface 121 and the docking interface 122.

However, it is further understood that additional interfaces (which are not shown) can be included in the apparatus 100 for other purposes such as that of supplying power to the disk cartridge 110. For example, if the cartridge interface 121 and the docking interface 122 are configured to transmit data signals there between by wireless means, and without contact there between, an additional connective power interface (not shown) can be included in the apparatus 100 to facilitate the supply of power to the disk cartridge 110. That is, one of a plurality of interfaces can be connective, while other of the plurality of interfaces can be non-connective, or wireless.

However, it is understood that a set of interfaces (such as cartridge interface 121 and docking interface 122) can be configured to transmit power there between by wireless means, such as by laser beam, micro wave, inductive conductance, and the like. That is, the instant invention is not intended to be limited to embodiments in which power is transmitted between the disk cartridge 110 and the docking device 130 by connective means only. Further, the disk cartridge can have its own on-board power supply, such as a battery. In this case the battery can be a rechargeable battery, and the storage rack in which the disk cartridge is stored when not being used can include a battery charging unit, such as an inductive battery charging device.

Figure 3:
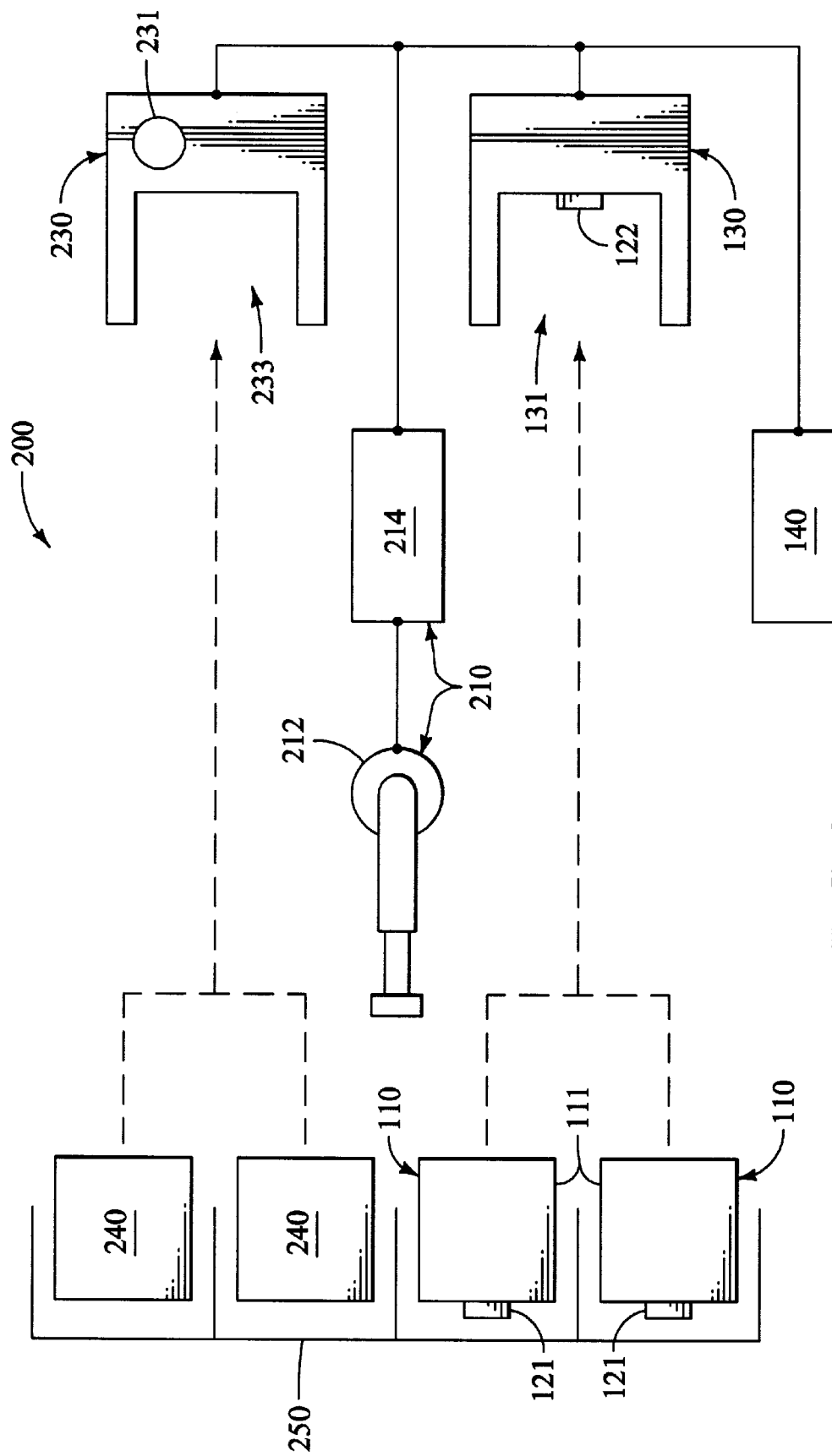
FIG. 3 is a schematic diagram of an apparatus in accordance with another embodiment of the present invention.

Moving now to FIG. 3, schematic diagram is shown which depicts an apparatus 200 in accordance with another embodiment of the present invention. The apparatus 200 is generally configured as a data storage apparatus. The apparatus 200 is configured to receive a disk cartridge 110 which is described above with reference to FIGS. 1 and 2. As is evident from a study of FIG. 3, the apparatus 200 preferably is configured to receive a plurality of disk cartridges 110. Each disk cartridge 110 comprises a cartridge shell 111 as well as a cartridge interface 121. The cartridge shell 111 and the cartridge interface 121 are described above with reference to FIGS. 1 and 2.

As is also evident from a study of FIG. 3, the apparatus 200 comprises a docking device 130 which is described above with reference to FIGS. 1 and 2. The docking device 130 comprises a receptacle 131 which is defined thereon, and also comprises a docking interface 122 which is preferably mounted on the docking device and withing the receptacle. Both the receptacle 131 and the docking interface 122 are described above with reference to FIGS. 1 and 2. As shown in FIG. 3, the respective dashed line indicates that any of the disk cartridges 110 can be placed into the receptacle 131, as described above with reference to FIGS. 1 and 2, wherein, when so placed into the receptacle, the respective disk cartridge is communicatively linked with the docking device 130 for the passage of data signals there between.

Thus, when a given disk cartridge 110 is positioned within the receptacle 131, data can be written to the disk cartridge from any other device which is in signal communication with the docking device 130, such as the host computer 140, as shown. Similarly, when the given disk cartridge 110 is positioned in the receptacle 131, data can be read from the disk cartridge and transmitted to any other device which is in signal communication with the docking device 130, such as the host computer 140.

The apparatus 200 can also be configured to receive at least one tape cartridge 240. Tape cartridges are known in the art and thus, the operation and configuration thereof need not be discussed in detail. A tape drive 230 can also be included in the apparatus 200. Tape drives are also known in the art and so the operation and configuration thereof need not be discussed in detail with the exception that it shall be pointed out that the tape drive 230 comprises a tape read/write device 231 which is configured to perform read/write operations on the tape cartridges 240. Such tape read/write devices are known in the art and are typically included in the tape drive 230.

That is, the tape drive 230 comprises the tape read/write device 231 as well as other components and features such as a slot 233 or the like into which each of the tape cartridges 240 can be placed and temporarily supported during read/write operations performed thereon by the read/write device, as is indicated by the respective dashed line shown in FIG. 3. The tape drive 230 can be in signal communication with any other device, such as the host computer 140. Thus, data can be written to a given tape cartridge 240 from the host computer 140 by way of the tape drive 230. Similarly, data can be read from the given tape cartridge 240 and transmitted to the host computer 140 by way of the tape drive 231.

The apparatus 200 preferably comprises a storage support 250 which is configured to isolatively store a plurality of disk cartridges 110 thereon, and which is preferably configured to also isolatively store a plurality of tape cartridges 240 thereon in the case wherein tape cartridges are included in the apparatus. The apparatus 200 can comprise an automated tape handling device 210 which can comprise, for example, a robotic gripper arm 212 and a controller 214 which is in signal communication with the gripper arm. The gripper arm 212 is configured to grip the disk cartridges 110 and further configured to move the respective cartridges 110, 240 between the respective isolatively stored positions on the storage support 250 and the respective docking device 131 or tape drive 230.

That is, gripper arm 212 in conjunction with the controller 214 can move the disk cartridges 110 between the support 250 and the docking device 130, and can also move the tape cartridges 240 between support and the tape drive 230. Preferably, the host computer 140 is in signal communication with the tape handling device 210, as shown, which allows the host computer to direct the handling device to retrieve a given cartridge 110, 240 from the support 250 and to load the given cartridge into the respective docking device 130 or tape drive 230 in order to retrieve given data or in order to write data to the given cartridge, as required. It is understood, however, that the automated cartridge handling device 210 can be omitted from the apparatus 200, in which case the cartridges 110,240 can be manually moved between the respective docking device 130, or tape drive 230, and the support 250.

As is evident from a study of FIG. 3, the apparatus 200 can be configured to function as a data storage system which can employ a plurality of disk cartridges 110, or a mixture of disk cartridges 110 and tape cartridges 240, as data storage media. Preferably, the disk cartridges 110 and the tape cartridges 240 adhere to a common cartridge form factor which will facilitate ease of handling by the automated cartridge handling device 214. In this manner, the disk cartridges 110 along with the docking device 130 can be beneficially integrated, or retrofitted, into existing automated library systems which are configured to employ tape cartridges 240 along with tape drives 230. Alternatively, the tape cartridges 240 as well as the tape drive 230 can be omitted from the apparatus 200, in which case only the disk cartridges 110 are employed as data storage media, in conjunction with the docking device 130 and the host computer 140.

Still referring to FIG. 3, during operation of the apparatus 200, a decision is made to perform a read/write procedure on a given cartridge 110, 240. Accordingly, the given cartridge 110, 240 is located, retrieved from the support 250, and placed into either the docking device 130 or the tape drive 230, as applicable. That is, if the given cartridge is a disk cartridge 110, then the disk cartridge is placed into the receptacle 131 of the docking device 130. Similarly, if the given cartridge is a tape cartridge 240, then the tape cartridge is placed into the slot 233 of the tape drive 230. The given cartridge 110, 240 can be moved to the applicable docking device 130 or tape drive 230 by way of the automatic cartridge handling device 210. Alternatively, the given cartridge 110, 240 can be moved manually. Until such time as the given cartridge 110, 240 is placed into the applicable docking device 130 or tape drive 230, the given cartridge is preferably isolatively stored on the storage support 250.

As a specific example, the host computer 140 can determine that data is to be written to a given disk cartridge 110 which is isolatively stored on the storage support 250. The host computer 140 can send a signal to the controller 214 which signal notifies the controller to cause the gripper arm 212 to move the given disk cartridge 110 to the docking device 130. The controller 214 can then cause the gripper arm 212 to retrieve the given disk cartridge 110 from its respective isolatively stored position on the storage support 250 and to move the given disk cartridge to the docking device 130 by placing the given disk cartridge into the receptacle 131 so as to communicatively link the cartridge interface 121 and the docking interface 122.

The host computer 140 can then send data to the docking device, whereupon the data is transmitted from the docking device 130 to the given disk cartridge 110 by way of the communicative link-up between the respective cartridge interface 121 and the docking interface 122. The data is then written to the given disk cartridge 110. When the data is completely written to the given disk cartridge 110, the controller 214 can cause the gripper arm 212 to remove the disk cartridge from the docking device 130 and to place the disk cartridge in an isolatively stored position upon the storage support 250.

After an elapsed period of time, the host computer 140 can determine that the data which was written to the given disk cartridge 110 is to be read from the given disk cartridge. Accordingly, the host computer 140 can cause the controller 214, in conjunction with the gripper arm 212, to retrieve the given disk cartridge 110 from its respective isolatively stored position on the storage support 250, and to place the disk cartridge into the receptacle 131 of the docking device 130 so as to communicatively re-link the cartridge interface 121 and the docking interface 122. The data is then read from the given disk cartridge 110 and sent to the host computer 140 by way of the cartridge interface 121, docking interface 122, and docking device 130.

It is noted that during the interim period of time between the data writing and data reading operations which are performed on the given disk cartridge 110, the given disk cartridge is isolatively stored. It is further noted that the only time the given cartridge 110 is communicatively linked to any other device (such as the docking device 130) is during the time when the given cartridge is resident within the receptacle 131. Thus, the disk cartridge 110 is distinguishable from prior art disk drive modules in that any given prior art disk drive module is communicatively linked to at least one other device at substantially all times during which the given module is considered to be operational.

Figure 4:
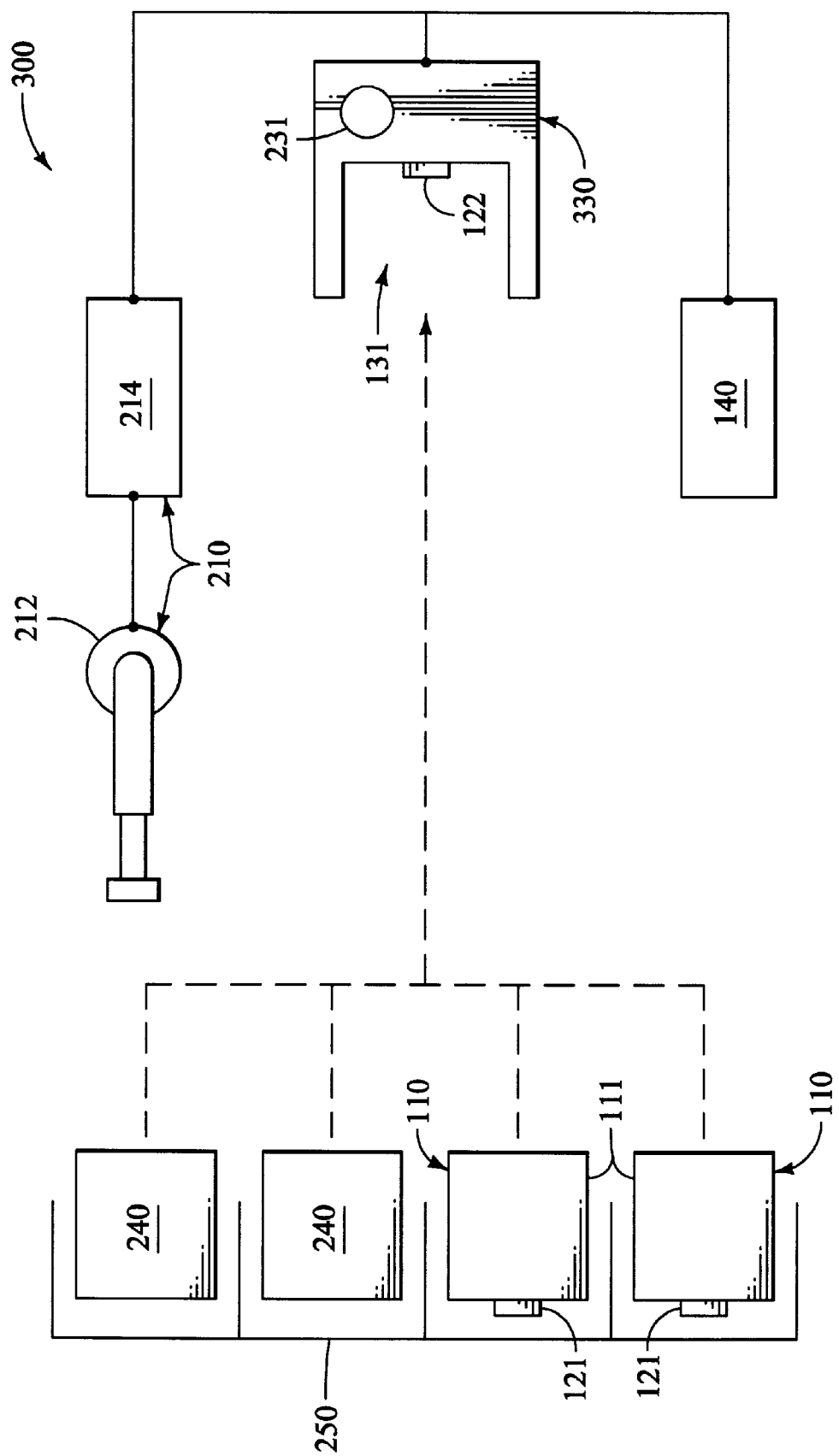
FIG. 4 is a schematic diagram of an apparatus in accordance with yet another embodiment of the present invention.

Turning now to FIG. 4, a schematic diagram is shown which depicts an apparatus 300 in accordance with yet another embodiment of the present invention. The apparatus 300 can be configured in a manner that is substantially similar to that of the apparatus 200, which is described above with reference to FIG. 3, in that many components are common to both the apparatus 200 and 300, as will become more apparent in the following discussion. Furthermore, both the apparatus 200 and 300 are generally configured as data storage systems.

Still referring to FIG. 4, the apparatus 300 is configured to receive a disk cartridge 110, and preferably a plurality of disk cartridges. Each of the disk cartridges 110 comprise a cartridge interface 121. The disk cartridge 110 and cartridge interface 121 are described above with reference to FIGS. 1 through 3. As is seen in FIG. 4, the apparatus 300 can also be configured to receive at least one tape cartridge 240 which has also been described above with reference to FIG. 3. In the case wherein both disk cartridges 110 as well as tape cartridges 240 can be received in the apparatus 300, as shown in FIG. 4, then the disk cartridges and tape cartridges both preferably adhere to a common cartridge form factor. The apparatus 300 preferably comprises a storage support 250 which is configured to isolatively store the disk cartridges 110. The storage support 250 can also be configured to isolatively support the tape cartridges 240, as required.

The apparatus 300 also comprises a docking device 330. The docking device 330 can be configured in a manner which is substantially identical to that of the docking device 230 which is described above with reference to FIG. 3. That is, as is evident from a study of FIG. 4, the docking device 330 of the apparatus 300 comprises a receptacle 131 which is defined on the docking device. The docking device 330 also comprises a docking interface 122 which is preferably supported on the docking device and within the receptacle 131 of the docking device. As is indicated by the dashed lines shown in FIG. 4, each of the tape cartridges 240, as well as each of the disk cartridges 110, can be placed into the receptacle 131 of the docking device 330, wherein read/write operations can be performed on the respective cartridge.

As is further evident, the docking device 330 of the apparatus 300 is slightly different from the docking device 230 of the apparatus 200 in that the docking device 330 can comprise a tape read/write device 231 which is preferably integrally incorporated therewith. That is, the docking device 330 preferably comprises a tape read/write device 231 which is configured to perform read/write operations on the tape cartridges 240 when the tape cartridges are placed into the receptacle 131. Likewise, as is seen, the docking device 330 comprises a docking interface 122 which is configured to communicatively link with the respective cartridge interface 121 of each of the disk cartridges in order to facilitate the performance of read/write operations on the disk cartridges. Thus, the docking device 330 is preferably configured to facilitate the performance of read/write operations on both the tape cartridges 240 as well as the disk cartridges 110. This allows the docking device 330 and the disk cartridges 110 to be advantageously incorporated into existing tape cartridge libraries, for example, and further allows the use of a single docking device to perform read/write operations on a plurality of disk cartridges and tape cartridges.

As is evident, the tape cartridges 240, as well as the disk cartridges 110, can be moved manually between their respective isolatively stored positions on the storage support 250 and the docking device 330. However, the apparatus 300 preferably comprises an automatic cartridge handling device 210 which is configured to move the cartridges 110, 240 between the storage support 250 and the docking device 330. The cartridge handling device 210 has been explained above with reference to FIG. 3. The operation of the apparatus 300 can be substantially identical to that of the apparatus 200 which is described above with reference to FIG. 3, except that, with regard to the apparatus 300, the tape cartridges 240 as well as the disk cartridges 110 can be placed into the docking device 330 for the performance of read/write operations. That is, as discussed above, the apparatus 300, as shown in FIG. 4, can utilize a single read/write device such as the docking device 330, rather than separate disk cartridge and tape cartridge read/write devices (i.e. the docking device 130 and the tape drive 230 shown in FIG. 3) as in the apparatus 200.

In accordance with an additional embodiment of the present invention, a data storage method includes providing a hard disk memory medium and a host device. The hard disk is stored in a communicatively isolated condition. The method can comprise retrieving the hard disk from its communicatively isolated condition. The hard disk is communicatively linked to the host. This can be accomplished, for example, by operably supporting the hard disk within a cartridge shell so as to form a disk cartridge, and by placing the disk cartridge into a docking device, wherein the hard disk and the docking device are automatically communicatively linked, and wherein a communication link is thereby established between the hard disk and the host device.

Data can be transmitted from the host device to the hard disk and can thus be written to the hard disk. After data is written to the hard disk, the hard disk can be restored to its communicatively isolated condition, such as by being placed into storage on a storage rack or the like. After a period of time, the hard disk can be again retrieved from its communicatively isolated condition and can be communicatively re-linked to the host device. Upon such communicative re-linking of the hard disk and the host device, data can be read from the hard disk and can be transmitted to the host device. The hard disk can also be communicatively unlinked from the host and restored to a communicatively isolated condition. That is, after data is read from the hard disk, the signal communication between the hard disk and the host device is broken, whereupon the hard disk is replaced back into a communicatively isolated condition.

As mentioned above, the hard disk can be at least a portion of a disk cartridge, for example, in which case the method includes operably supporting the hard disk within a cartridge shell. Additionally, in the case wherein the hard disk is a portion of a disk cartridge, the hard disk can be communicatively linked with the host device by placement of the disk cartridge into a docking device, for example. Furthermore, the disk cartridge can be placed into the docking device by an automatic cartridge handling device or the like.

While the above invention has been described in language more or less specific as to structural and methodical features, it is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A data storage apparatus, comprising:
   a host device;
   a disk cartridge comprising:
      a cartridge shell;
      a hard disk operably supported within the cartridge shell;
      a cartridge interface mounted on the cartridge shell;
   a docking device comprising:
      a receptacle which is defined in the docking device, and which is configured to supportably receive the disk cartridge therein; and,
      a docking interface which is supported on the docking device, and which, in conjunction with the cartridge interface, is configured to communicatively link the disk cartridge with the host device while the disk cartridge is supported within the receptacle, wherein the cartridge interface and the docking interface are further configured to utilize radio waves in the transmission of data signals therebetween.

* * * * *